July 24, 1928.

H. G. DORSEY ET AL 1,678,560

APPARATUS FOR MEASURING DISTANCE

Filed Nov. 12, 1925

INVENTORS
Herbert G. Dorsey
Robert L. Williams
by Ezekiel Wolf
ATTORNEY

July 24, 1928.
H. G. DORSEY ET AL
APPARATUS FOR MEASURING DISTANCE
Filed Nov. 12, 1925  4 Sheets-Sheet 2
1,678,560
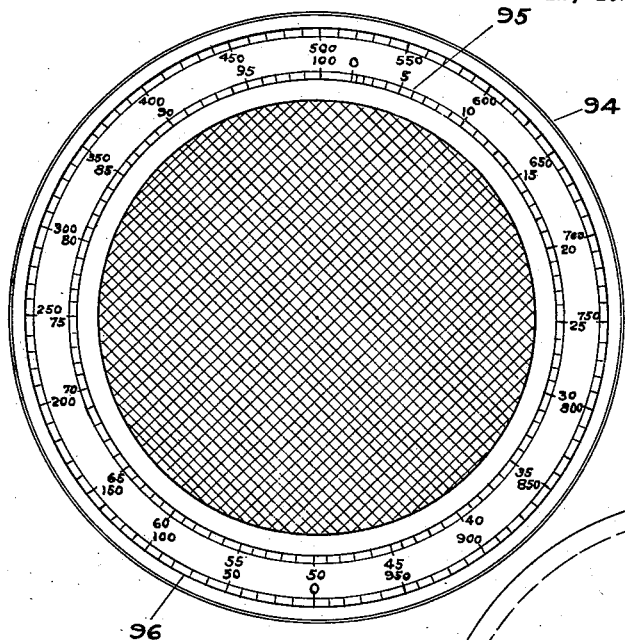
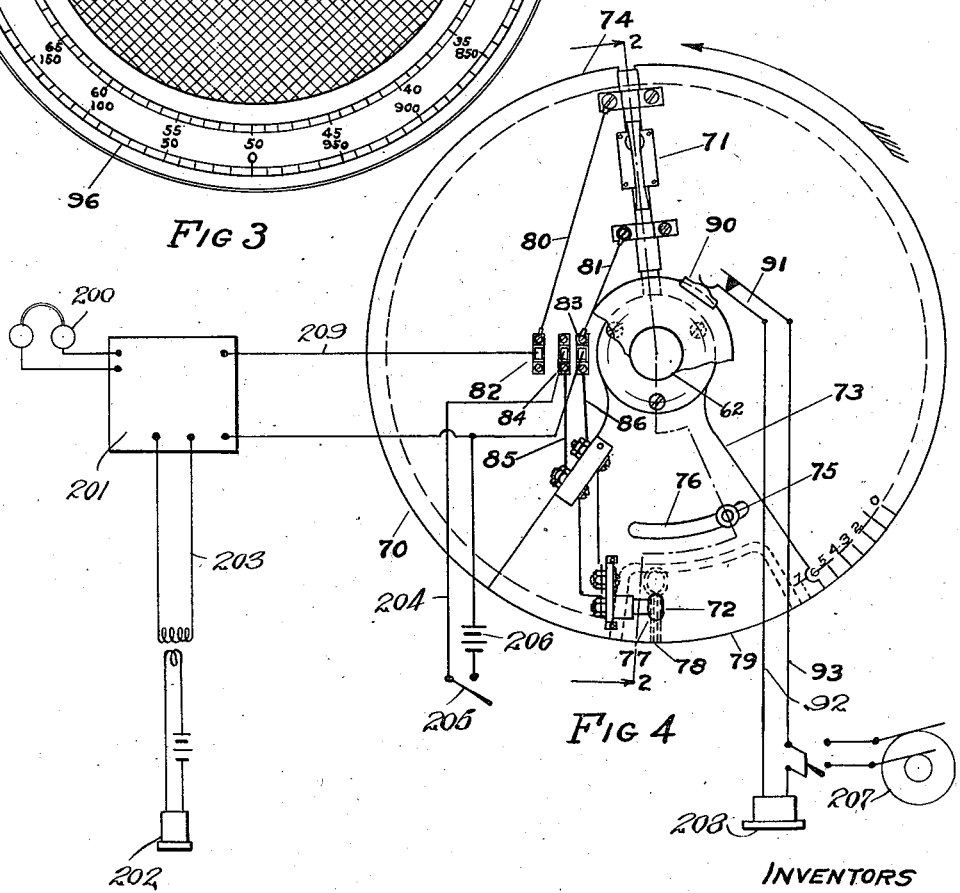
INVENTORS
Herbert G. Dorsey
Robert L. Williams
by Ezekiel Wolf
ATTORNEY July 24, 1928.
H. G. DORSEY ET AL
1,678,560
APPARATUS FOR MEASURING DISTANCE
Filed Nov. 12, 1925   4 Sheets-Sheet 3
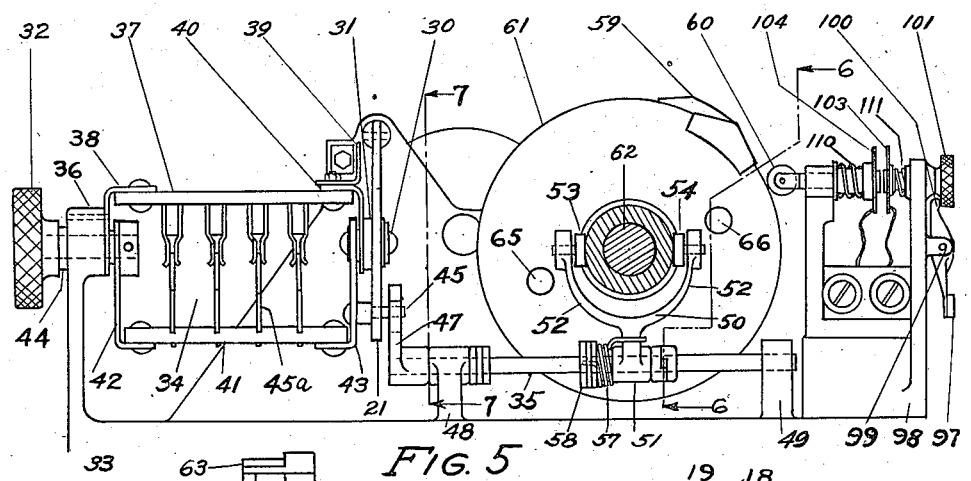
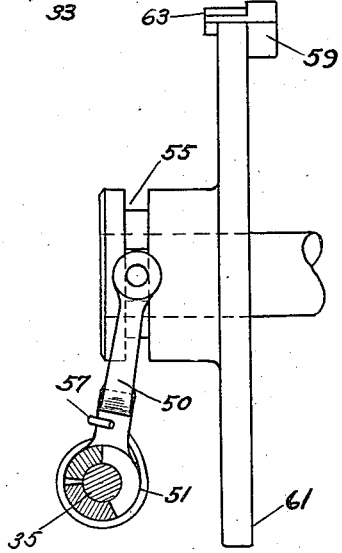
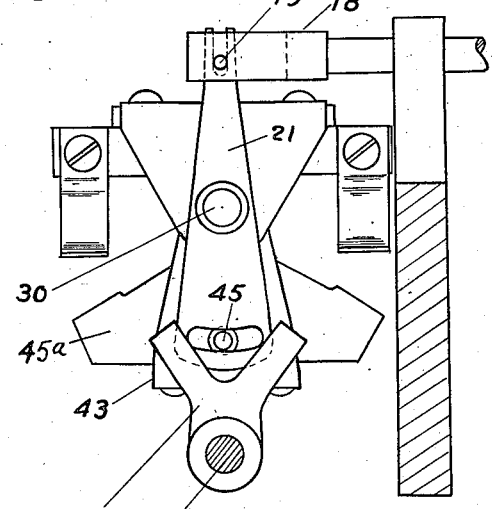
INVENTORS
Herbert G. Dorsey
Robert L. Williams
by
Ezekiel Wolf
ATTORNEY

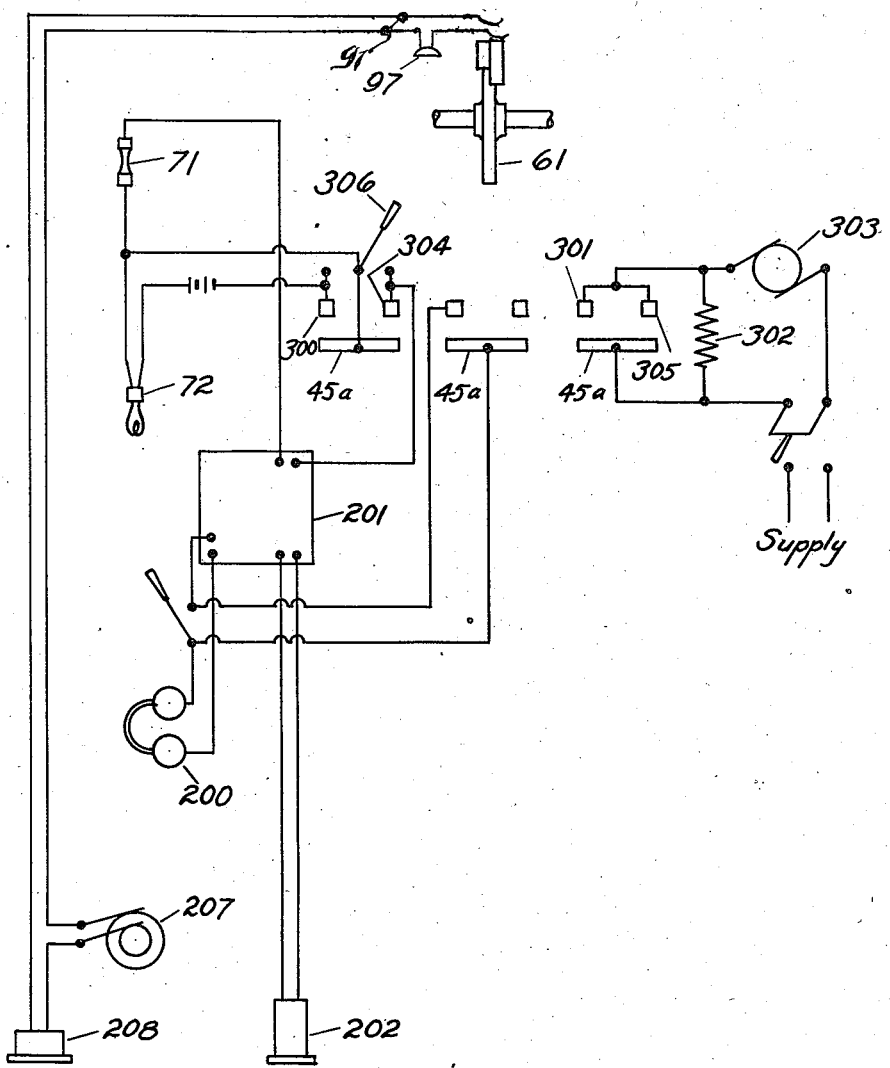

Patented July 24, 1928.

1,678,560

UNITED STATES PATENT OFFICE.

HERBERT GROVE DORSEY, OF GLOUCESTER, AND ROBERT LONGFELLOW WILLIAMS, OF NEWTON, MASSACHUSETTS, ASSIGNORS TO SUBMARINE SIGNAL CORPORATION, OF BOSTON, MASSACHUSETTS, A CORPORATION OF DELAWARE.

APPARATUS FOR MEASURING DISTANCE.

Application filed November 12, 1925. Serial No. 68,694.

The present invention relates to improvements in apparatus for determining distance and more particularly to improvements in apparatus as disclosed in the copending patent applications of Herbert Grove Dorsey, Serial No. 682,243 filed December 22, 1923 and Robert Longfellow Williams, Serial No. 686,922 filed January 17, 1924.

More particularly the present invention combines in one apparatus the methods and apparatus of the above two applications. This application, however, does not claim the specific features of draft adjustment and the adjustment for length of sound, which features are claimed in the companion application of Herbert Grove Dorsey filed the same date as the present application. Other features of the present invention will be learned from the following description and drawing in which:

Figure 3 shows a detail of the apparatus.

Figure 4 shows another detail.

Figure 5 shows a front view of the apparatus showing certain details.

Figure 6 shows a side view of a detail of Figure 5 on the lines 6—6.

Figure 7 shows a detail of the switch mechanism of Figure 5 on the line 7—7.

Figure 8 shows in diagrammatic form the elements and wiring of the circuit.

Figure 1:
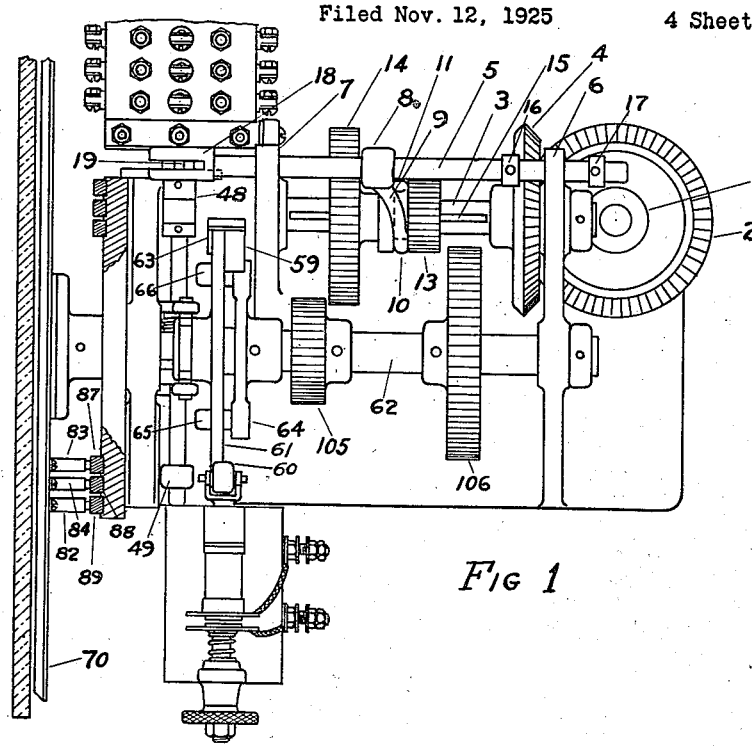
Figure 1 shows a view of the apparatus looking down from the top.

In determining distances or depths of water by acoustic methods such as employed in the present application it is found advantageous to use other methods for short depth and distances than for deeper depth and distances. The inventors have found that for the most part the signal returning from deep water is weaker than the signal returning from shallow water. Consequently, to measure deep depths much more sensitive receiving and indicating apparatus is necessary than for shallow depths. On the other hand, the degree of accuracy required in shallow water measurement is far greater than in deep water measurement, with the result that for deep water a rather sensitive but somewhat inaccurate system will operate to give practical results, while for shallow water the apparatus need not be extremely sensitive but must be extremely accurate.

It has been found possible in rather shallow water to cause the echo received to operate an indicating device rendering the indication of the depth automatic with extremely accurate results. However, without tremendous amplification it is impossible to operate the same type of apparatus for deep water, yet by being satisfied with fair accuracy deep depths can be simply measured. The inventors have recognized the inherent difficulties of using the same apparatus for all depths and have combined in one system apparatus which is particularly efficient and practical to operate for all depths. In combining properly the most advantageous methods in one apparatus, certain features have to be cared for particularly. For instance, in finding deep depths in soundings upon a vessel the slight error, introduced by change of the draft of the vessel and, therefore, the change of the distance which the measuring apparatus is below the surface of the water, is a very small fraction of the total depth and would not, therefore, ordinarily need to be corrected. For shallow depths however, this error becomes important since being a constant amount, in proportion to the total depth it becomes a greater fraction as the total depth decreases.

Since in the present device the same mechanism rotates both shallow water and deep water indicators, a means of correction must be provided which will correct the shallow water indicator independently of the deep water indicator, as will be seen later from the description and operation of the apparatus. While, of course, it is desirable to correct both indicators it will be noted in the disclosure below that the shallow water indicator must be corrected independently of the deep water indicator.

The deep water indicator rotates at slower speed than the shallow water indicator and as will be seen in the present design consequently the sound signal emitted for determining deep water depths is longer than that for shallow water. However, even this additional length of the acoustic note has not been found long enough so that an additional mechanism is used whereby an extra long signal is obtained. As it is desirable to accomplish the changing from the employment of one method to the employment of another method in as short a time as possible, it is desirable to make the change without ceasing operation of the machine. Special means must, therefore, be employed to take care of all contingencies which might arise in changing from one method to another.

Figure 2:
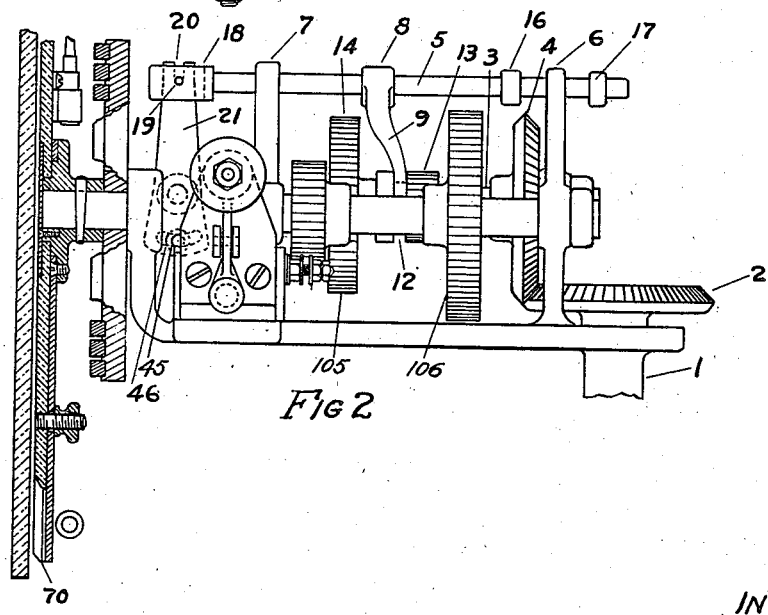
Figure 2 shows a side view of the apparatus of Figure 1.

In Figure 2 a motor, not shown, drives the shaft 1 at constant speed. A beveled gear 2 rigidly attached to shaft 1 rotates the horizontal shaft 3 by means of the beveled gear 4 meshing with the gear 2. A longitudinally adjustable shaft 5 movable in bearings 6 and 7 carries a collar 8 fixed firmly to the said shaft 5. The collar 8 is integral with a forked piece 9, the two prongs, 10 and 11, of which rest easily in a groove 12 (see Figure 2) of the piece carrying the shifting gears 13 and 14. These shifting gears are made of one piece of material or rigidly fastened together and are adjustable longitudinally upon the shaft 3 by means of a key (not shown) fitting into the slot 15. As has been stated above the shaft 5 is movable longitudinally in the bearing 6 and 7. Stops 16 and 17 are provided to limit the motion of this shaft which may be either fixed or adjustable. The end of the shaft 5 carries a slotted collar 18 through which is a stud 19 which straddles a fork 20 of the piece 21. The piece 21 is shown rather plainly in Figures 5 and 7. It is shaped somewhat like the sector of a circular disc and pivoted as shown at 30 in a bearing 31. The knurled knob 32 through the side wall 33 of the case controls not only the action of the pivoted sector 21 but also the electric switch 34 and the shaft 35 controlling the cam changing mechanism.

As shown in Figure 5 the knurled knob 32 operates through a bearing 36 to which the stationary part 37 of the switch is rigidly attached by means of the angle 38. The other end of the part 37 is rigidly supported by the angle 39 while the angle 40, also rigidly positioned, carries the bearing 31 in which the piece 21 is pivoted. The movable part 41 of the switch has an angle at each end 42 and 43, the angle 42 being rigidly attached to the shaft 44 of the knurled knob 32 so that by turning the knob 32, the knife blades 45ª of the switch 34 would contact with the spring forks on the right or left, depending whether rotation of the knob was clockwise or counter clockwise.

The angle 43 carries a stud 45 which is attached in any suitable manner to the angle 43. This stud extends through the piece 21 in the slot 46 as shown both in Figures 2 and 7. As shown in Figure 5 the slot engages further the forked piece 47, bearing upon the prongs of the latter when operating the cam switching device about to be described.

The cam switching shaft 35 is pivoted in bearing 48 and 49 best shown in Figure 5 but also shown in Figure 1. Pivoted with this cam shaft, as an axis, is the piece 50 which consists of a hollow cylindrical piece 51 through which the shaft 35 passes, but not locked thereto, and a forked piece 52, the cylindrical piece and forked piece being cast in one. The ends of the forked pieces contain rollers 53 and 54 which engage in a groove 55 in the cam 61. As the piece 50 is not rigidly secured to the shaft 35, rotation of the shaft would not move the forked cams 53 and 54 if it were not for the spring 57. This spring is rigidly secured at one end to the shaft 35 by the locking piece 58 while the other end is bent around the neck of the piece 50. When, therefore, the shaft 35 is turned, the forked piece will follow on account of the spring 57 unless there is some resistance to prevent its motion, as when the shoulder of the dog 59 and the roller 60 happen to be adjacent to each other. This happens rather rarely but is a contingency which must be cared for else it may at times be impossible to shift the cam disc 61 longitudinally upon the shaft 62. It is evident, of course, in order to provide a longer contact by means of the dog 59 than of the dog 63 that the dog 59 will be raised at the ends above the dog 63. Since the same roller 60 is used to control the contacts for operating the sound signal, it is necessary in changing from the short to the long signal to shift the cam disc 61 over to the left in Figure 1 until the dog 59 comes in line with the roller 60. If, in making this shift, the edge of the dog 59 strikes the roller 60, it will still be possible to turn the knurled knob 32 completely to perform the various functions of changing over the system, since the shaft 35 will turn its full angular rotation tensioning the spring 57 which will have enough energy to force the dog 59 in line with the roller 60 when the dog has moved beyond its striking position.

The cam disc 61 fits loosely upon the shaft 62 and is rotated in the following manner:

A disc 64 is provided which is rigidly fixed to the shaft 62. This disc has a couple of studs 65 and 66 which pass through holes in the disc 61 and are sufficient in length to care for the longitudinal shift of the cam disc 61.

As will be evident from the above description, the knob 32 controls and operates the gears 13 and 14 which when moved to the left in Figure 2 give the shaft 62 a rapid motion and when moved to the right a slow motion when the apparatus is in operation. The shaft 62 carries with it the disc 64 which is coupled through the studs 65 and 66 to the cam disc 61. The shaft 62 also rotates the indicator disc 70 bearing both the shallow water indicator 71 and the deep water indicator 72. The indicating disc is composed of two parts, one a sector 73 which is rigidly attached to the shaft 62 and the disc 74 which is adjustably coupled to the sector 73 by means of the thumb screw 75 which passes through an arcuate slot 76 of the sector so that the position of the disc relative to the sector and therefore to the dogs of the cam 61 may be adjustable within the angle necessary as will be seen later.

The sector 73 carries a small light 77 positioned behind a slit 78 in the sector, which is covered over with a translucent white sheet of material, through which the light 77 shines. When the shallow water indicator is used the light 77 may be put out eliminating from view the deep water indicator entirely. This is cared for by the switch 34. The disc 74 is cut away at 79 over the angular area through which disc and sector may move relatively to each other. In this way whatever position the disc 74 might assume, it will not conceal the slot 78 in the sector.

The indicator 71 is fixed behind a slit (not shown) in the disc 74. This slit is covered by a red translucent material through which the light of the indicator 71 shines when the indicator operates. The leads 80 and 81 of the indicator 71 are brought to the brushes 82 and 83 respectively and those of the light 72 to the brushes 84 and 83 by means of the leads 85 and 86. The brush 83 serves therefore as the common of the two indicators.

These brushes bear upon the concentric rings 87, 88 and 89 in the relation shown in Figure 1.

Upon the back of the disc 74 are graduations shown in Figure 4 from 0 to 7. The edge of the sector 73 is set upon the correct figure corresponding to the draft of the vessel. A half circle is cut out of the sector so that the figures may be more readily visible.

It will be noted, of course, that since the sector is fixed relative to the cam dogs, the draft adjustment is applicable only to the shallow water indicator 71. The arrow in Figure 4 indicates the direction in which the disc rotates. The dog 90, in Figure 4, which corresponds in position to the dogs 59 and 63 and diagrammatically stands for them, shows that the contact 91 which controls the operation of the sound emitter through the leads 92 and 93 is closed at relatively the same times with respect to the indicator 72 but at different times relatively to the indicator 71 dependent upon the position of the sector 73.

In the relative positions shown in Figure 4, it is evident that the indicator 71 has just passed the zero position as shown by the 100 mark at the top of the inner scale upon the dial face 94 when the draft correction is set for 6 fathoms draft correction which, of course, may correspond to six fathom correction in draft or may be associated with a curve corresponding to some other spacing between the sound transmitter and the sound receiver. It may be noted at least that this correction is along the right direction, since when the sender and receiver are far down beneath the surface the time interval measurement is shorter than the actual depth so that if true depths were to be indicated it would be necessary to have the indicator already beyond its zero mark when the signal is given. As a matter of fact there are a number of corrections to be cared for, as for instance, the initial lag in the sending circuit, that in the receiving circuit, and the correction for the spacing of the sender and receiver as regards increasing depths.

The initial lag of operation and receiving will tend to make the depths appear deeper than they really are, since the time interval between the sending and the receiving will be longer than the time taken for the sound to travel to the bottom and back. The distance between receivers with respect to depths to be measured will also tend to make depths appear deeper. This last correction is cared for by the particular calibration of the scale for shallow water as is seen by the marking on the inner scale 95. It may be observed that this correction decreases as the depth increases, since for deep depths the distance between the sender and receiver is small when compared to the depth, and the actual distance measured comes very close to being the actual depth since the path of travel of the sound is almost in a vertical direction. For depths calibrated upon the second scale 96 which commences at the bottom of the dial at the outside, both the draft correction and the spacing correction of the sender and receiver are unnecessary since the error is approximately small compared to the depth. For proper measurment, therefore, there is provided a means for correcting the inner scale and measurements as has been outlined above without adjustment of the outer scale or depth associated with those measurements.

Although the inner scale is shown calibated up to 100 which is 100 fathoms, it can be used for much deeper depths as well, provided the echo signal is sufficiently strong to operate the indicator.

As will be learned from the other copending applications mentioned above, the shallow water indicator is entirely automatic. The echo signal being recieved upon a receiver operates the indicator which in the present application is shown as a neon discharge tube 71. This indicator is constantly rotated by a motor (not shown) through the shaft 1, which is geared to the shaft 62.

As shown in Figure 4 and in other figures, when the dog 59 or 63 or its diagrammatical equivalent 90 of Figure 4 gets into the proper position, the sound emitter 208 is sounded by the generator 207. This normally happens once every revolution of the indicators so that during the revolution, the incoming signal either operates the automatic indicator 71 by being received by the receiver 202 and transmitted by means of the transformer circuit 203 to the indicating operating means 201 such as described in the previously mentioned application of Herbert Grove Dorsey, Serial No. 682,243, which operating means operates through the circuit 209, the automatic indicator 71, or causes a response in the telephone 200 in such a manner that the operator may place the position of the indicator 72 if the deep depth method is used as described in the Williams application mentioned previously.

In the present application the apparatus involved in producing the operation of the automatic indicator 71 has been called the automatic means for indicating shallow water depth since the indication is given automatically and requires of the operator the mere noting of the position of the flash upon the dial 95. In the operation for deep depth, however, while the operator is not required to perform any manual operation of setting an indicator or of picking up a signal and moving an adjusting device, he is required to synchronize the beat of the returning echo with the position of the rotating indicator 72, and thus the operation while not fairly described as automatic has been described as semi-automatic. This is in substance the method employed in the Williams application 686,922 mentioned previously.

Figure 8 shows diagrammatically the operation of the system as a whole. In starting the operation of the sounding apparatus the switch to the supply is closed thus driving the motor 303 which drives the mechanism for rotating the indicators 71 and 72. If the circuit is, as shown in Figure 8, which is the position when the motor is running idle, the resistance 302 is in series with the motor armature and the motor therefore runs slower than normal speed.

The blades 45ᵃ as shown in Figure 5 are mounted on a single switch. In operating for deep depth indications, these blades are connected to the contacts on the left. The first blade on the left serves to light the indicator 72 in this position, the second throws the phones 200 in circuit and the third cuts out the resistance 302 allowing the motor to come up to speed. The mechanism for operating the sounder is shown illustratively by the cam 61 which carries the rises shown at its top for closing the contact to operate the sounder. The button shown as 97 corresponds with 97 of Figure 5. When 97 is pressed the circuit to the sounder 208 is held open in spite of the action of the rises on the cam 61.

It may be remarked, however, that there is a possibility that the depth may be so deep when the shallow water indicator is used that the signal will not return before the next signal is being sent. If this condition is noted it is possible to prevent the occurrence of the following signal by means of the key 97 shown in Figure 5 which is pivoted on the bracket 98 at the point 99 and which possesses at its other end a hook engaging under the flange 100 of the knurled adjusting screw 101. This screw has at its other end the disc contact 103 which is opposed to the contact 104 which is pushed to the right in Figure 5 by the roller 60 when the dog 59 or 63 hits it. To make the operation of the electrodes 104 and 103 very rapid, spring 110 is used. When electrode 104 is forced to the right, the spring 110 is tensioned so that it will have a tendency to fly back to its normal position. The spring 111 tends to hold the contact 103 in its proper position as well as to return it to such a position as soon as possible after the key 97 is released. To prevent operation of the sound emitter, the key 97 is pressed when the dog is about to force the contact 104 to the right. In this manner as many revolutions of the indicator can pass by as desired without emitting a signal.

In using this key with shallow depths, if one revolution has passed before the signal comes in, it will simply be necessary to add 100 to the reading which is obtained; if two revolutions, 200; and so forth. The same method is applicable to deep depths, except that in this 1000 is added for each revolution.

The operation should be fairly obvious from the description above. If the shallow water indicator is to be used the light 72 is not illuminated in which case no indicator will normally be visible to an observer looking at the dial. In Figures 1 and 2 the gears 14 and 13 are shifted to the left so that gear 14 meshes with the small gear 105 so that the shaft 62 is driven at the higher speed. This shift is accomplished by the knob 32 which rotates the arm 21 in a counter-clockwise direction shown in Figure 2. At the same time the stud 45 is moved to the right in a counter-clockwise direction as shown in Figure 2 until the stud bears against the shoulder of the piece 47 (Figure 7) and rotates the shaft 35 clockwise as viewed from the end shown in Figure 7. At the same time the switch blades make the proper contacts to change over the indicator, slow the speed of the motor while throwing in gears and make other changes which might be necessary.

If deep depths are desired the knob 32 is turned in the opposite direction which meshes the gear 13 with the gear 106 thereby causing the disc, indicator, and cam to rotate at the slower speed and also presents the longer contact dog 59 to the roller 60 through the proper rotation of the shaft 35. For the deeper depths, therefore, not only is additional length given to the signal on account of the slower speed of rotation of the cam disc but also a longer contact dog is provided.

In the system described above almost any depth can be measured. In some cases the automatic method designed to be used for the shallower depths laps considerably over the deep depth range. If it happens that the shallow water indicator operates for deep depths it is only necessary to press the key 97 to extend the range of measurement to any depth without changing to the deeper depth method.

Having described our invention we claim:

1. A system for measuring depths of water including a rotating member, means for driving the same at a constant and known speed, a sound producer, a sound receiver, means whereby rotation of the rotating member causes periodic operation of the sound producer, circular scales, two visual indicators carried by said rotating member and moving in cooperation with the scales, one of said indicators for deep sounding, the other of said indicators capable of producing a line of light on the scale in response to the operation of the sound receiver for shallow sounding, an audible indicating means operative in response to operation of the sound receiver to cooperate with the deep sounding indicator, and means for shifting from operation with the shallow water indicator to the deep water indicator or the reverse.

2. A system for measuring depths of water including a rotating member, means for driving the same at a constant and known speed, a sound producer, a sound receiver, means whereby rotation of the rotating member causes periodic operation of the sound producer, circular scales, two visual indicators carried by said rotating member and moving in cooperation with the scales, one of said indicators for deep sounding, the other of said indicators capable of producing a line of light on the scale in response to the operation of the sound receiver for shallow sounding, an audible indicating means operative in response to operation of the sound receiver to cooperate with the deep sounding indicator, and means for operating said system with only one indicator.

3. A system for measuring depths of water including a rotating member, means for driving the same at a constant and known speed, a sound producer, a sound receiver, means whereby rotation of the rotating member causes periodic operation of the sound producer, circular scales, two visual indicators carried in concentric positions by said rotating member and moving in cooperation with the scales, one of said indicators for deep sounding, the other of said indicators capable of producing a line of light on the scale in response to the operation of the sound receiver for shallow sounding, an audible indicating means operative in response to operation of the sound receiver to cooperate with the deep sounding indicator, and means for operating said system with only one indicator.

4. A system for measuring depths of water including a rotating member, means for driving the same at a constant and known speed, a sound producer, a sound receiver, means whereby rotation of the rotating member causes periodic operation of the sound producer, circular scales, two visual indicators carried by said rotating member and moving in cooperation with the scales, one of said indicators for deep sounding, the other of said indicators capable of producing a line of light on the scale in response to the operation of the sound receiver for shallow sounding, an audible indicating means operative in response to operation of the sound receiver to cooperate with the deep sounding indicator, said deep sounding indicator adapted to be continuously illuminated, and means for selecting which indicator is to be used.

In testimony whereof we affix our signatures.

HERBERT GROVE DORSEY.
ROBERT LONGFELLOW WILLIAMS.